(12) United States Patent
Seok et al.

(10) Patent No.: US 9,585,058 B2
(45) Date of Patent: *Feb. 28, 2017

(54) METHOD AND APPARATUS FOR TRANSMITTING AND RECEIVING FRAME INCLUDING PARTIAL ASSOCIATION IDENTIFIER IN WIRELESS LAN SYSTEM

(71) Applicant: LG Electronics Inc., Seoul (KR)

(72) Inventors: Yongho Seok, Anyang-si (KR); Seunghee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/397,687

(22) PCT Filed: Apr. 24, 2013

(86) PCT No.: PCT/KR2013/003509
§ 371 (c)(1),
(2) Date: Oct. 29, 2014

(87) PCT Pub. No.: WO2013/162280
PCT Pub. Date: Oct. 31, 2013

(65) Prior Publication Data
US 2015/0131640 A1    May 14, 2015

Related U.S. Application Data

(60) Provisional application No. 61/637,310, filed on Apr. 24, 2012, provisional application No. 61/662,871, (Continued)

(51) Int. Cl.
*H04W 28/06* (2009.01)
*H04W 76/02* (2009.01)
(Continued)

(52) U.S. Cl.
CPC .......... *H04W 28/06* (2013.01); *H04L 5/0044* (2013.01); *H04W 76/021* (2013.01); *H04W 84/12* (2013.01); *Y02B 60/50* (2013.01)

(58) Field of Classification Search
CPC ... H04W 28/06; H04W 76/021; H04W 84/12; Y02B 60/50; H04L 5/0044
See application file for complete search history.

(56) References Cited

U.S. PATENT DOCUMENTS 6,259,898 B1    7/2001   Lewis
2008/0144591 A1  6/2008   Jokela
(Continued)

FOREIGN PATENT DOCUMENTS

CA    2782730 A1    6/2011
CN    1581709 A     2/2005
(Continued)

OTHER PUBLICATIONS

LG Electronics: "Partial AID", IEEE 802.11-12/1079r0, Yongho Seok, Sep. 17, 2012.
(Continued)

*Primary Examiner* — Jianye Wu
(74) *Attorney, Agent, or Firm* — Dentons, US LLP

(57) ABSTRACT

A method and apparatus for transmitting and receiving a frame including a partial association ID (PAID) in a wireless LAN (WLAN) system are disclosed. A method for transmitting a frame from a station (STA) to an access point (AP) in a wireless communication system includes: calculating a partial association ID (Partial AID) on the basis of a basic service set ID (BSSID) of the AP; and transmitting the frame including a partial AID field set to a specific value corresponding to the calculation result of the partial AID to the AP. The partial AID is calculated by applying a modulo operation to a specific value obtained by converting values (Continued)

ranging from a 40$^{th}$ bit position to a 48$^{th}$ bit position from among 48 bit positions of the BSSID of the AP into a decimal number.

15 Claims, 19 Drawing Sheets

Related U.S. Application Data filed on Jun. 21, 2012, provisional application No. 61/666,860, filed on Jun. 30, 2012, provisional application No. 61/692,686, filed on Aug. 23, 2012, provisional application No. 61/698,645, filed on Sep. 9, 2012, provisional application No. 61/699,868, filed on Sep. 12, 2012.

(51) Int. Cl.
*H04L 5/00* (2006.01)
*H04W 84/12* (2009.01)

(56) References Cited

U.S. PATENT DOCUMENTS

| | | | |
|---|---|---|---|
| 2009/0296619 A1 | 12/2009 | Sammour et al. | |
| 2012/0044925 A1 | 2/2012 | Lee et al. | |
| 2012/0051312 A1 | 3/2012 | Noh et al. | |
| 2012/0287850 A1* | 11/2012 | Wentink | H04W 52/0206 370/328 |
| 2012/0300684 A1* | 11/2012 | Wentink | H04W 52/0216 370/311 |

FOREIGN PATENT DOCUMENTS

| | | |
|---|---|---|
| CN | 101595687 A | 12/2009 |
| CN | 102196470 A | 9/2011 |
| RU | 2010136921 A | 3/2012 |
| WO | 11/068387 A2 | 6/2011 |
| WO | 11/115408 A2 | 9/2011 |
| WO | 2012064837 A2 | 5/2012 |

OTHER PUBLICATIONS

IEEE 802.11-11/0587r2 Wireless LANs, Partial AID and GID, May 4, 2011.
IEEE: "IEEE P802.11ac/D3.0", Jun. 1, 2012, pp. i-360, XP055105695.
Simone Merlin (Qualcomm Inc): "Comment resolution clause 9.17a; 11-12-0320-01-00ac-comment-resolution-clause-9-17a", IEEE SA Mentor; 11-12-0320-01-00AC-Comment-Resolution-Clause-9-17A, IEEE-SA Mentor, Piscataway, NJ, USA, vol. 802.11ac, No. 1, Mar. 8, 2012, pp. 1-8, XP068038626.
"Partial AID", Sep. 17, 2012, IEEE 802.11-12/1079r0, XP055229828.
IEEE: "Part 11: Wireless LAN Medium Access Control (MAC) and Physical Layer Specifications (PHY) Specifications—Amendment 4: Enhancements for Very High Throughput for Operation in Bands below 6GHz", IEEE P802.11ac(TM)/O2.0, Draft Standard for Information Technology, Jan. 19, 2012, XP055229118.
IEEE: "Part 11: Wireless LAN Medium Access Control (MAC) and Physical Layer Specifications (PHY) specifications—Amendment 4: Enhancements for Very High Throughput for Operation in Bands below 6GHz", IEEE P802.11ac(TM)/O2.0, Draft Standard for Information Technology, Jan. 19, 2012, XP055229435.
Jarkko Kneckt, 'Partial AID for Group Address Frames and Mesh BSS', IEEE 802.11-11/0445r1, Mar. 16, 2011.
Jarkko Kneckt, 'Group Addressed MSDUs in 802.11ac', IEEE 802.11-11/0950r1, Jul. 12, 2011.
IEEE P802.11ac(TM)/D2.0, "Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHZ", Jan. 2012.

\* cited by examiner

| Category | Action | Reason Code | OBSS Partial BSSID List |
|---|---|---|---|

Octets:   1   1   1   1xn (b)

| Category | Action | New AID | AID Activation Offset | Duty Cycle (e.g., Sleep Interval or Inactivity Duration) |
|---|---|---|---|---|

Octets:   1   1   2   1   1

| B0 | B1 | B2 | B3 | B4 | B5 | B6 | B7 | B8 | B9 | B10 | B11 | B12 | B13 | B14 | B15 | B16 | B17 | B18 | B19 |
|---|---|---|---|---|---|---|---|---|---|---|---|---|---|---|---|---|---|---|---|
| 0 | 0 | 0 | 0 | 0 | 1 | 1 | 1 | 0 | 1 | 0 | 0 | 0 | 1 | 0 | 0 | 0 | 0 | 1 | 0 |

2MHz SIGB (b)

| B0 | B1 | B2 | B3 | B4 | B5 | B6 | B7 | B8 | B9 | B10 | B11 | B12 | B13 | B14 | B15 | B16 | B17 | B18 | B19 | B20 |
|---|---|---|---|---|---|---|---|---|---|---|---|---|---|---|---|---|---|---|---|---|
| 1 | 0 | 1 | 0 | 0 | 1 | 0 | 1 | 1 | 0 | 1 | 0 | 0 | 0 | 1 | 0 | 0 | 0 | 0 | 1 | 1 |

4MHz SIGB (c)

| B0 | B1 | B2 | B3 | B4 | B5 | B6 | B7 | B8 | B9 | B10 | B11 | B12 | B13 | B14 | B15 | B16 | B17 | B18 | B19 | B20 | B21 | B22 |
|---|---|---|---|---|---|---|---|---|---|---|---|---|---|---|---|---|---|---|---|---|---|---|
| 0 | 1 | 0 | 1 | 0 | 0 | 1 | 1 | 0 | 0 | 1 | 0 | 1 | 1 | 1 | 1 | 1 | 1 | 1 | 0 | 0 | 1 | 0 |

8MHz / 16MHz / 8+8MHz SIGB

FIG. 17

| | | | | | | | | | | | | |
|---|---|---|---|---|---|---|---|---|---|---|---|---|
| 2MHz | 20 bits | 6 tail bits | | | | | | | | | | |
| 4MHz | 21 bits | 6 tail bits | 21 bits | 6 tail bits | | | | | | | | |
| 8MHz | 23 bits | 6 tail bits | 23 bits | 6 tail bits | 23 bits | 6 tail bits | 1 pad bit | | | | | |
| 16MHz | 23 bits | 6 tail bits | 23 bits | 6 tail bits | 1 pad bit | 23 bits | 6 tail bits | 23 bits | 6 tail bits | 23 bits | 6 tail bits | 1 pad bit |

METHOD AND APPARATUS FOR TRANSMITTING AND RECEIVING FRAME INCLUDING PARTIAL ASSOCIATION IDENTIFIER IN WIRELESS LAN SYSTEM

This application is a 35 USC §371 National Stage entry of International Application No. PCT/KR2013/003509 filed on Apr. 24, 2013, and claims priority to U.S. Provisional Application Nos. 61/637,310 filed on Apr. 24, 2012; 61/662,871 filed on Jun. 21, 2012; 61/666,860 filed on Jun. 30, 2012; 61/692,686 filed on Aug. 23, 2012; 61/698,645 filed on Sep. 9, 2012 and 61/699,868 filed on Sep. 12, 2012, all of which are hereby incorporated by reference in their entireties as if fully set forth herein.

TECHNICAL FIELD

The present invention relates to a wireless communication system, and more particularly to a method and apparatus for transmitting and receiving a frame including a partial association identifier (PAID) in a wireless LAN (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DISCLOSURE

Technical Problem

Accordingly, the present invention is directed to a method and apparatus for transmitting and receiving a frame including a partial association identifier (PAID) in a WLAN system that substantially obviate one or more problems due to limitations and disadvantages of the related art. Machine to Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

WLAN communication is carried out in mediums shared among all devices. In case of increasing the number of devices as in M2M communication, much time is taken to access a channel of one device, such that overall system performance is unavoidably deteriorated, resulting in difficulty in power saving of each device.

An object of the present invention is to provide a method for configuring a frame including a partial association identifier (PAID).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a frame from a station (STA) to an access point (AP) of a wireless communication system including: calculating a partial association ID (Partial AID) on the basis of a basic service set ID (BSSID) of the AP; and transmitting the frame including a partial AID field set to a specific value corresponding to the calculation result of the partial AID to the AP, wherein the partial AID is calculated by applying a modulo operation to a specific value obtained by converting values ranging from a $40^{th}$ bit position to a $48^{th}$ bit position from among 48 bit positions of the BSSID of the AP into a decimal number.

In another aspect of the present invention, a method for receiving a frame from a station (STA) at an access point (AP) of a wireless communication system includes: determining whether a value of a partial association ID (Partial AID) field of the frame is calculated on the basis of a basic service set ID (BSSID) of the AP; and decoding the frame, if the value of the partial AID field of the frame is calculated on the basis of the BSSID of the AP, wherein the partial AID is calculated by applying a modulo operation to a specific value obtained by converting values ranging from a $40^{th}$ bit position to a $48^{th}$ bit position from among 48 bit positions of the BSSID of the AP into a decimal number.

In another aspect of the present invention, a station (STA) device for transmitting a frame to an access point (AP) of a wireless communication system includes a transceiver, and a processor. The processor calculates a partial association ID (Partial AID) on the basis of a basic service set ID (BSSID) of the AP, and transmits the frame including a partial AID (PAID) field set to a specific value corresponding to the calculation result of the partial AID using the transceiver to the AP. The partial AID is calculated by applying a modulo operation to a specific value obtained by converting values ranging from a $40^{th}$ bit position to a $48^{th}$ bit position from among 48 bit positions of the BSSID of the AP into a decimal number.

In another aspect of the present invention, an access point (AP) device for receiving a frame from a station (STA) of a wireless communication system includes a transceiver and a processor. The processor determines whether a value of a partial association ID (Partial AID) field of the frame is calculated on the basis of a basic service set ID (BSSID) of the AP, and decodes the frame, if the value of the partial AID field of the frame is calculated on the basis of the BSSID of the AP. The partial AID is calculated by applying a modulo operation to a specific value obtained by converting values ranging from a $40^{th}$ bit position to a $48^{th}$ bit position from among 48 bit positions of the BSSID of the AP into a decimal number.

The following description may be commonly applied to the embodiments of the present invention.

The calculation result of the partial AID (PAID) may be set to one of 1 to 511.

The partial AID may be calculated by $(\text{dec}(BSSID[39:47])\text{mod}(2^9-1))+1$, where $\text{dec}(A)$ may be a specific value obtained by converting A into a decimal number, $A[b:c]$ may be bits from Bit B to Bit C of A when a first bit of a binary number A is denoted by Bit 0, and 'mod' may denote a modulo operation.

The partial AID (PAID) field may be included in a Signal A (SIG-A) field of the frame.

The frame may be a single user (SU) frame.

The frame may be defined at a sub-1 GHz operation frequency.

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention may provide a method and apparatus for constructing a frame including a partial association ID (PAID).

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 15(*a*) exemplarily shows an example of an AID reassignment request frame format, and FIG. 15(*b*) exemplarily shows an example of an AID reassignment response frame format.

FIG. 16 exemplarily shows fixed sequences available as an SIG-B field.

FIG. 17 is a conceptual diagram illustrating a method repeated in an SIG-B field when a fixed pattern of FIG. 16 is transferred to PPDU.

BEST MODE

Figure 1:
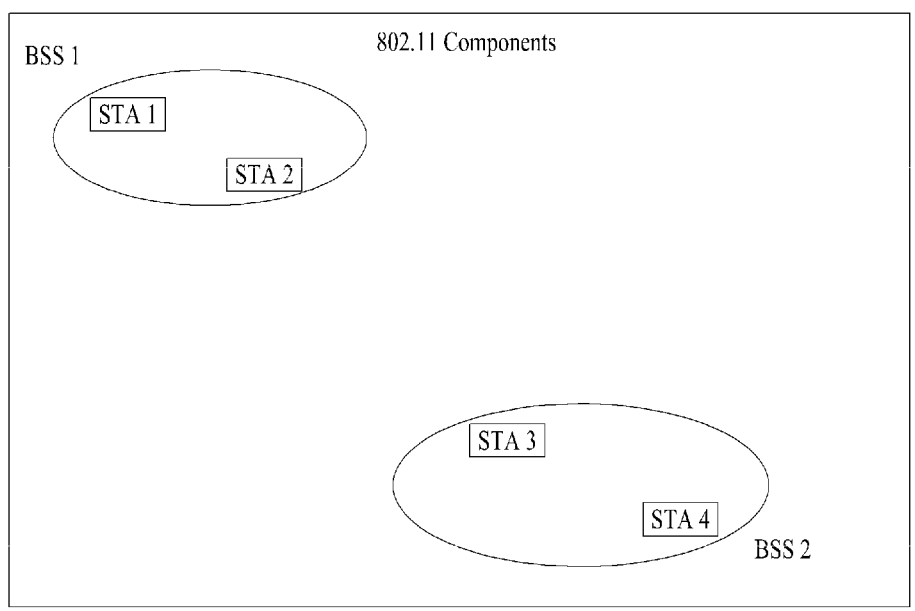
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
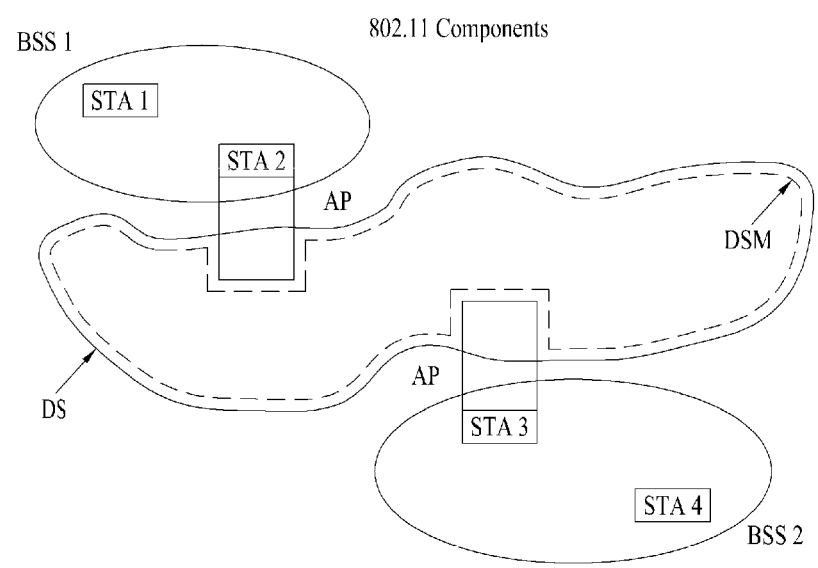
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
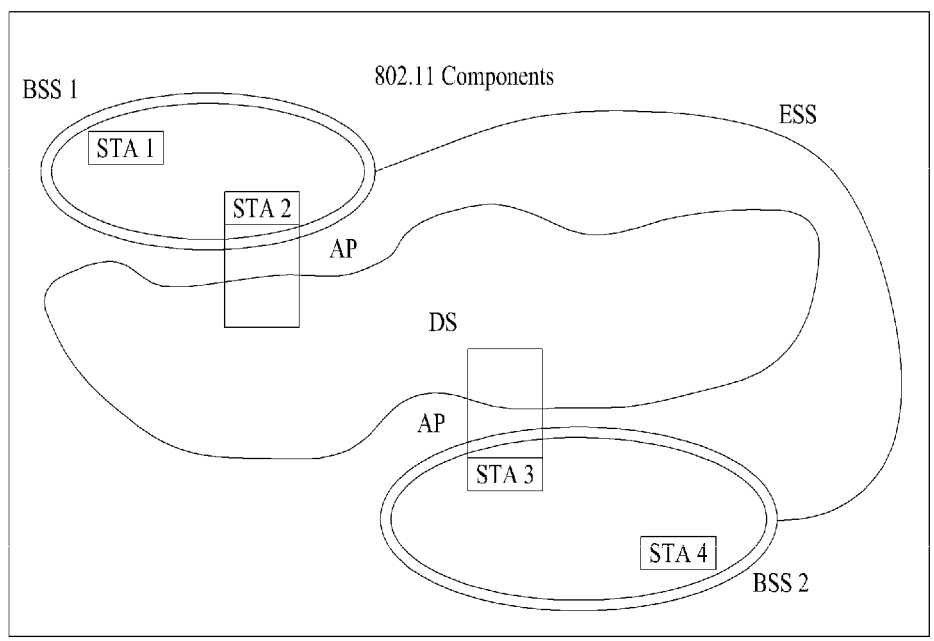
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
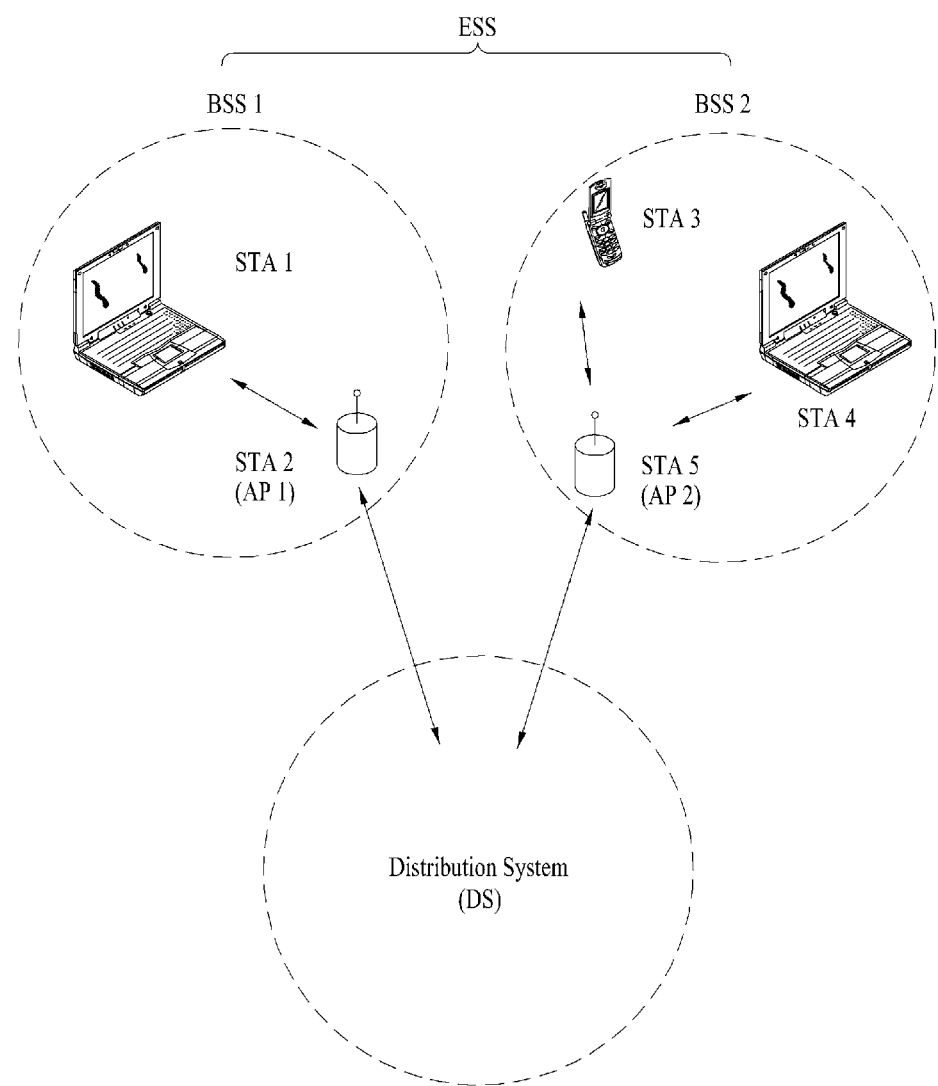
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
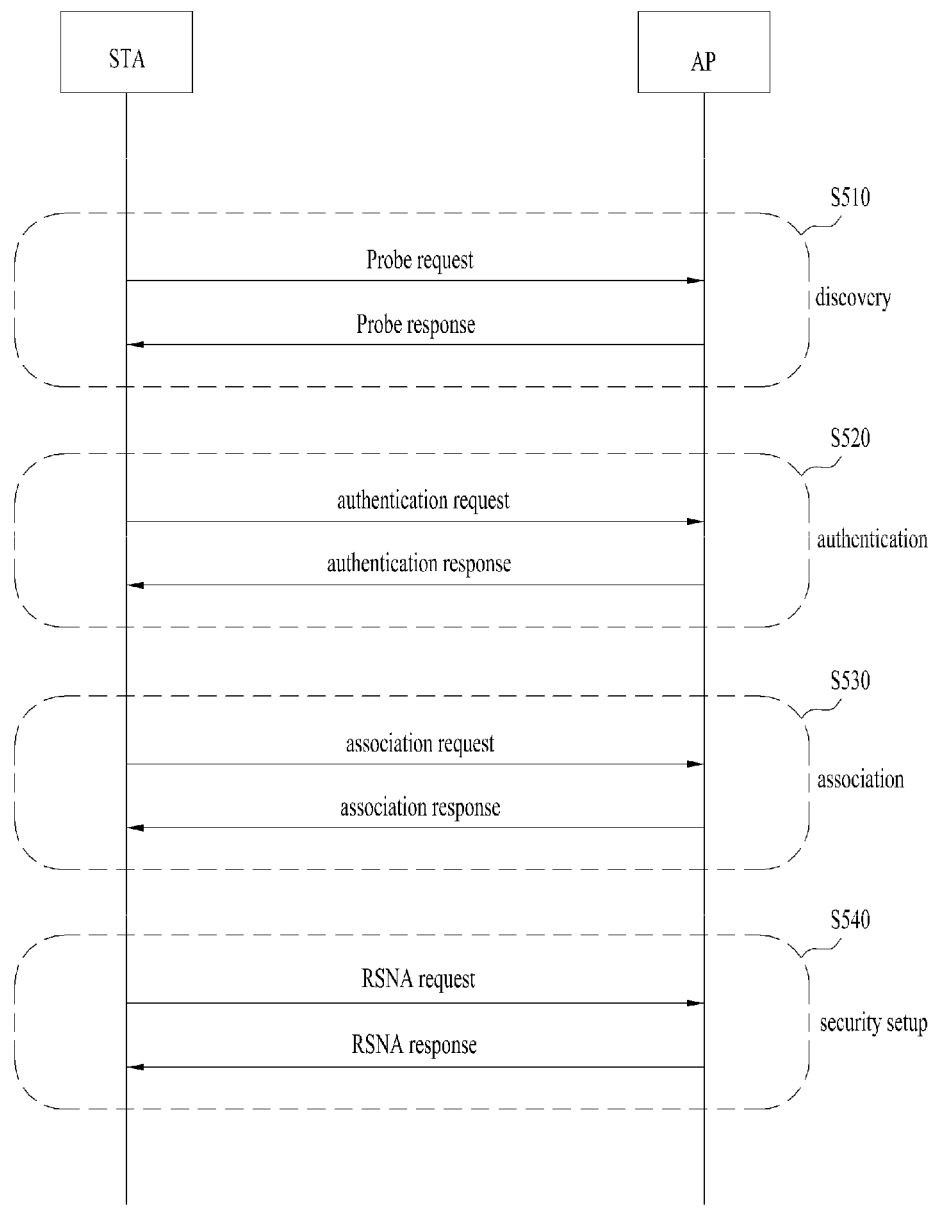
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). In addition, the STA operates according to a command received via downlink (i.e., a link from the AP to the non-AP STA) in M2M communication, such that data is reported through uplink (i.e., a link from the non-AP STA to the AP). M2M communication is mainly focused upon the communication scheme improved on uplink for transmission of the principal data. In addition, an M2M STA is mainly operated as a battery and the user may feel difficulty in frequently charging the M2M STA with electricity, such that battery consumption is minimized, resulting in an increased battery lifetime. In addition, the user may have difficulty in directly handling the M2M STA in a specific situation, such that a self-recovery function is needed. Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period, and at the same time can reduce power consumption of the STA.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

WLAN Operating at Sub-1 GHz

As described above, the IEEE 802.11ah standard in which M2M communication is set to a use case has recently been discussed. The IEEE 802.11ah standard is operated in an unlicensed band other than a TV whitespace band at a sub-1 GHz operation frequency, and has a wider coverage (for example, a maximum of 1 km) than a legacy WLAN mainly supporting a conventional indoor coverage. That is, differently from the legacy WLAN operated at a frequency of 2.4 GHz or 5 GHz, if a WLAN is operated at an operation frequency of sub-1 GHz (for example, 700~900 MHz), the AP coverage is increased about two or three times as compared to the same transmit (Tx) power due to propagation characteristics of the corresponding band. In this case, a large number of STAs may be connected per AP. The Use Case considered in the IEEE 802.11ah standard can be summarized as shown in the following Table 1.

TABLE 1

Use Case 1: Sensors and meters

1a: Smart Grid - Meter to Pole
1c: Environmental/Agricultural Monitoring
1d: Industrial process sensors
1e: Healthcare
1f: Healthcare
1g: Home/Building Automation
1h: Home sensors
Use Case 2: Backhaul Sensor and meter data Backhaul aggregation of sensors
Backhaul aggregation of industrial sensors
Use Case 3: Extended range Wi-Fi Outdoor extended range hotspot
Outdoor Wi-Fi for cellular traffic offloading In accordance with Use Case 1 of Table 1, M2M communication in which various kinds of sensors/meter devices are connected to an 802.11ah AP is made available. Specifically, smart grid technology enables a maximum of 6000 sensors/meter devices to be connected to one AP.

In accordance with Use Case 2 of Table 1, an 802.11ah AP configured to provide a large coverage serves as a backhaul link of a different system such as IEEE 802.15.4g.

In accordance with Use Case 3 of Table 1, Use Case 3 may support extended home coverage, campus wide coverage, and outdoor extended range hotspot communication such as shopping-mall range hotspot communication. In accordance with Use Case 3, an 802.11ah AP supports traffic offloading of cellular mobile communication, such that cellular traffic overload can be scattered.

A physical layer (PHY) for sub-1 GHz communication is implemented by performing 1/10 down-clocking of the legacy IEEE 802.11ac PHY. In this case, the channel bandwidth of 20/40/80/160/80+80 MHz for use in 802.11ac is provided through 1/10 down-clocking, and the channel bandwidth of 2/4/8/16/8+8 MHz is provided at sub-1 GHz. Therefore, a Guard Interval (GI) is increased from 0.8 µs to 8 µs, such that the GI is increased ten fold. The following Table 2 shows the result of comparison between 802.11ac PHY throughput and 1/10 down-clocked sub-1 GHz PHY throughput.

TABLE 2

| IEEE 802.11ac PHY Channel Bandwidth/Throughput | 1/10 down-clocked sub-1 GHz PHY Channel Bandwidth/Throughput |
|---|---|
| 20 MHz/86.7 Mbps | 2 MHz/8.67 Mbps |
| 40 MHz/200 Mbps | 4 MHz/20 Mbps |
| 80 MHz/433.3 Mbps | 8 MHz/43.33 Mbps |
| 160 MHz/866.7 Mbps | 16 MHz/86.67 Mbps |
| 80 + 80 MHz/866.6 Mbps | 8 + 8 MHz/86.66 Mbps |

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
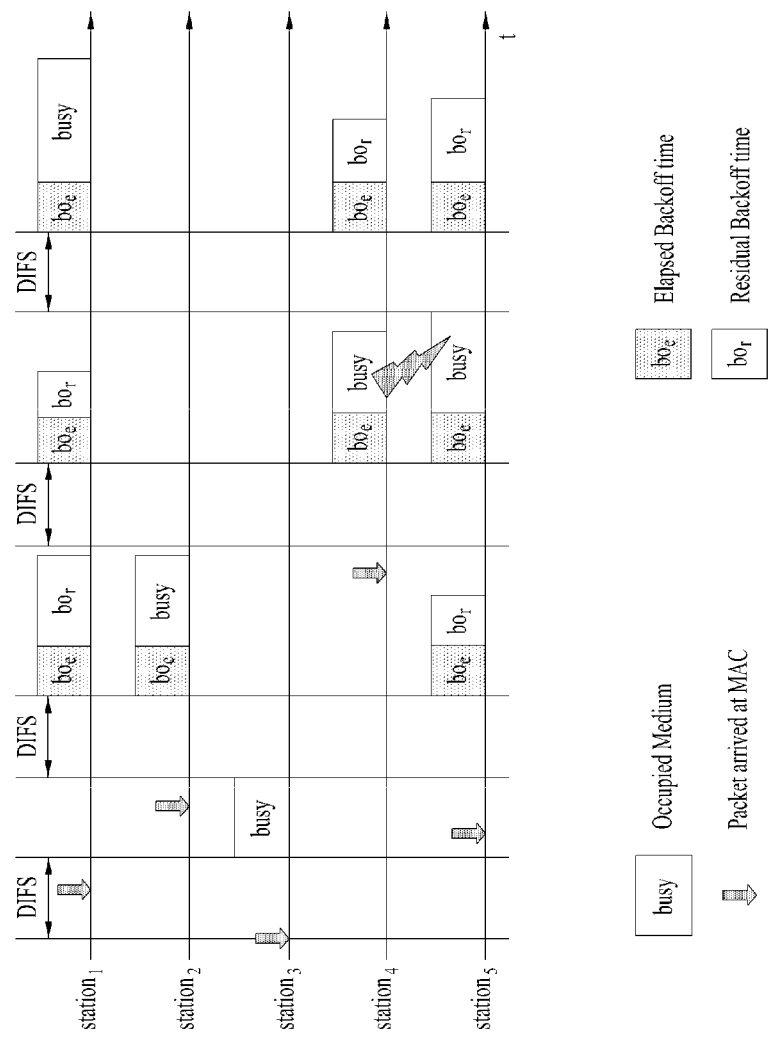
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy-or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, ... ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit or defer medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
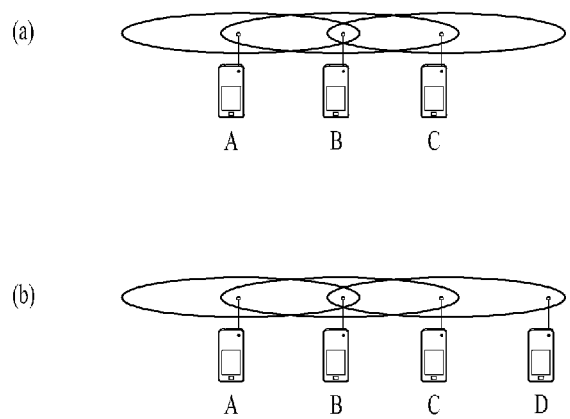
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
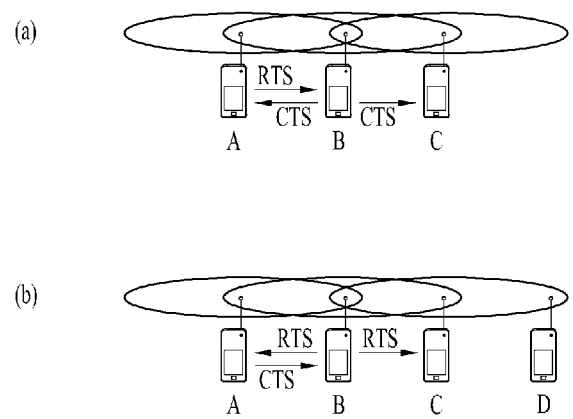
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C (국부 "STC C" 에나 STA C 로 수정).

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
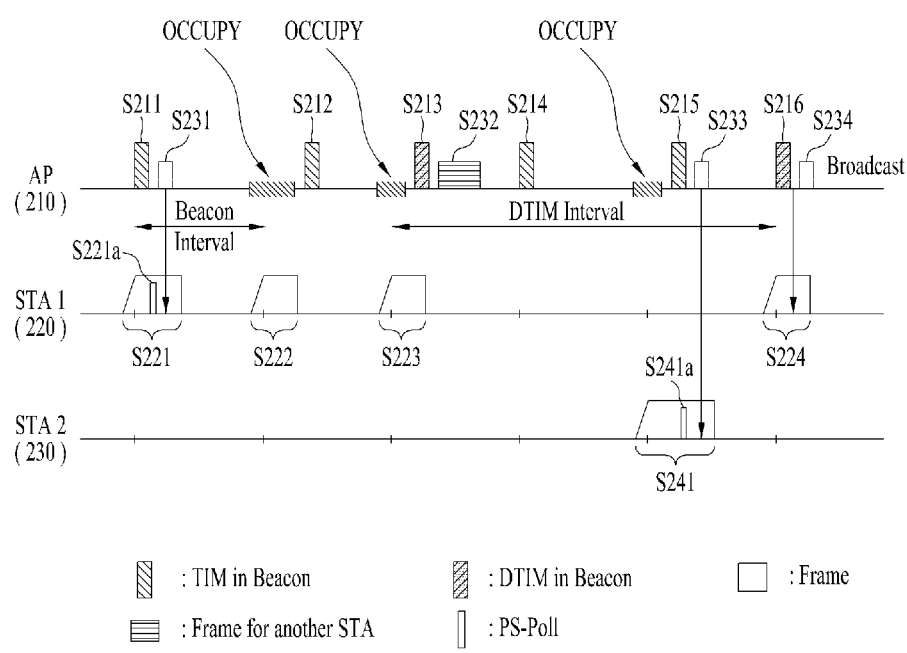
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241*a*. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
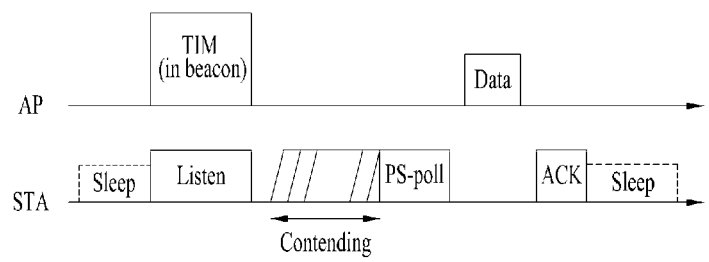
FIGS. 10 to 12 are conceptual diagrams illustrating detailed operations of a station (STA) having received a Traffic Indication Map (TIM).
Figure 11:
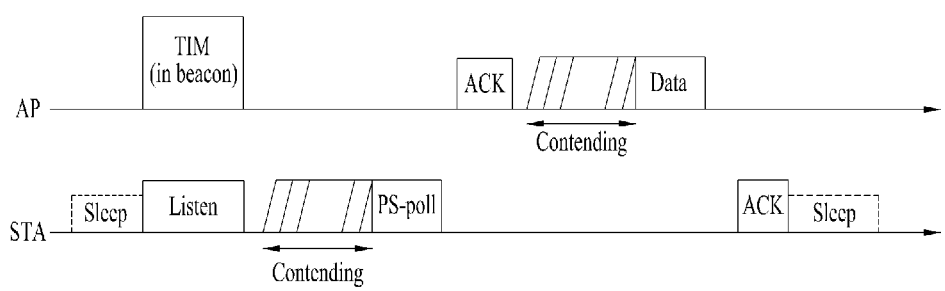
Figure 12:
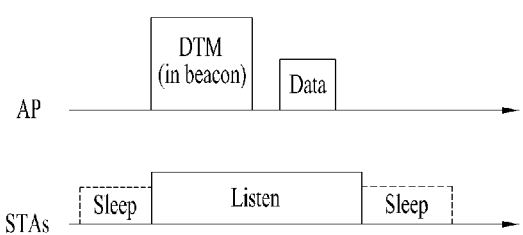

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

Figure 13:
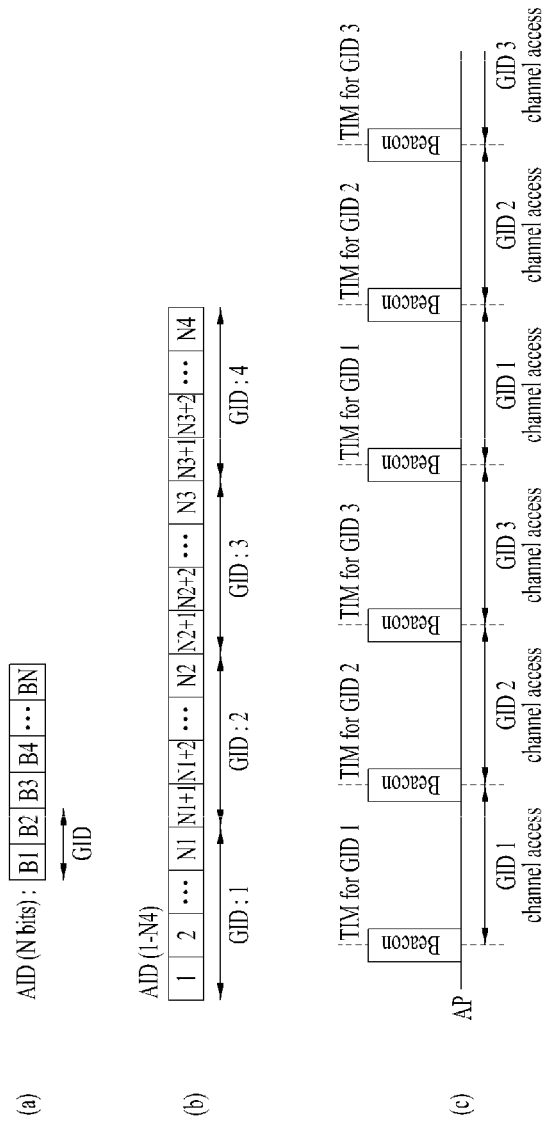
FIG. 13 is a conceptual diagram illustrating a group-based AID.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

PPDU Frame Format

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

Single User (SU) Frame/Multi User (MU) Frame

The present invention provides a method for constructing the SIG field in each of a SU frame and a MU frame using the WLAN system operating at a frequency of 1 GHz or less (for example, 902~928 MHz). The SU frame may be used in SU-MIMO, and the MU frame may be used in MU-MIMO. In the following description, the term "frame" may be a data frame or an NDP frame.

Figure 14:
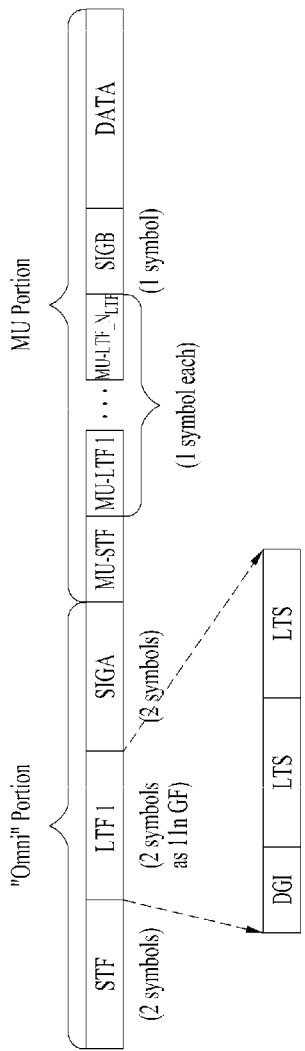
FIG. 14 exemplarily shows SU/MU frame formats.

FIG. 14 exemplarily shows SU/MU frame formats.

Referring to FIG. 14, STF, LTF1, and SIG-A (SIGNAL A) fields may correspond to an omni portion because they are transmitted to all STAs in omni directions. If necessary, beamforming or precoding may not be applied to STF, LTF1, and SIG-A (SIGNAL A) fields in case of data transmission.

In the meantime, MU-STF, MU-LTF1, . . . , MU-LTF_$N_{LTF}$, and SIG-B(SIGNAL B) fields located after the SIG-A field are user-specifically transmitted, and beamforming or precoding may be applied to each field before such transmission. The MU portion may include MU-STF, MU-LTF(s), SIG-B, and data fields as shown in the frame format of FIG. 14.

In the omni portion, each of STF, LTF1, and SIG-A fields may be transmitted as a single stream in association with each subcarrier, as represented by the following equation 1:

$$[x_k]_{N_{TX} \times 1} = [Q_k]_{N_{TX} \times 1} d_k \quad \text{[Equation 1]}$$

In Equation 1, k is a subcarrier (or tone) index, $x_k$ is a signal transmitted at a subcarrier k, and $N_{TX}$ is the number of Tx antennas. $Q_k$ is a column vector for encoding (e.g., space-mapping) a signal transmitted on a subcarrier (k), and $d_k$ is data being input to the encoder. In Equation 1, a Cyclic Shift Delay (CSD) of a time domain may be applied to $Q_k$. CSD of the time domain denotes a phase rotation or a phase shift on a frequency domain. Therefore, $Q_k$ may include a phase shift value on a tone (k) caused by the time domain CSD.

In the case of using the frame format of FIG. 14, STF, LTF1, and SIG-A fields may be received by all STAs. Each STA may decode the SIG-A field through channel estimation based on STF and LTF1.

The SIG-A field may include 'Length/Duration' information, 'Channel Bandwidth' information, and 'Number of Spatial Streams' information. The SIG-A field may have the length of two OFDM symbols. One OFDM symbol uses a Binary Phase Shift Keying (BPSK) modulation for 48 data tones, such that 24-bits information may be represented on one OFDM symbol. Accordingly, the SIG-A field may include 48-bits information.

The following Table 3 shows exemplary bit allocation of the SIG-A field with respect to the SU case and the MU case.

TABLE 3

|  | SU | MU |
| --- | --- | --- |
| SU/MU Indication | 1 | 1 |
| Length/Duration | 9 | 9 |
| MCS | 4 |  |
| BW | 2 | 2 |
| Aggregation | 1 |  |
| STBC | 1 | 1 |
| Coding | 2 | 5 |
| SGI | 1 | 1 |
| GID |  | 6 |
| Nsts | 2 | 8 |
| PAID | 9 |  |
| ACK Indication | 2 | 2 |
| Reserved | 3 | 3 |
| CRC | 4 | 4 |
| Tail | 6 | 6 |
| Total | 48 | 48 |

In Table 3, the SU/MU indication field may be used to discriminate between the SU frame format and the MU frame format.

The Length/Duration field represents OFDM symbols (i.e., duration) of the frame or the number of bytes (i.e., length) of the frame. If the aggregation field of the SU field is set to the value of 1, the Length/Duration field is interpreted as the duration field. In contrast, if the aggregation field is set to zero (0), the Length/Duration field is interpreted as the length field. The aggregation field is not defined in the MU frame, and the aggregation field is always applied to the MU field, such that the Length/Duration field is interpreted as the duration field.

The MCS field indicates the modulation and coding scheme for use in PSDU transmission. In case of the SU frame, the MCS field is transmitted through the SIG-A field. If other STAs (each of which may also be referred to as $3^{rd}$ party STA indirectly associated with transmission/reception between two STAs) are configured to receive the SU frame, the duration of the SU frame (i.e., SU-beamformed frame having an aggregation field of 0) currently received can be calculated on the basis of both the length value of the Length/Duration field and the value of the MCS field. On the other hand, in the MU field, the MCS field is not contained in the SIG-A field, and is contained in the SIG-B field carrying user-specific information, such that an independent MCS may be applied for each user.

A BW field represents a channel bandwidth of the SU frame or the MU frame. For example, the BW field may be set to a specific value indicating one of 2 MHz, 4 MHz, 8 MHz, 16 MH, and 8+8 MHz.

The aggregation field indicates whether a PSDU is aggregated in the form of an aggregation MPDU (i.e., A-MPDU). If the aggregation field is set to 1, this means that a PSDU is aggregated in the form of A-MPDU and then transmitted. If the aggregation field is set to 0, this means that a PSDU is transmitted without aggregation. In the MU frame, PSDU configured in the form of A-MPDU is always transmitted, the aggregation field need not be signaled, such that the PSDU is not contained in the SIG-A field.

A space time block coding (STBC) field indicates whether STBC is applied to the SU frame or the MU frame.

The coding field indicates the coding scheme for use in the SU frame or the MU frame. A Binary Convolutional Code (BCC) scheme, a Low Density Parity Check (LDPC) scheme, etc. may be applied to the SU frame. Independent coding schemes of individual users may be applied to the MU frame, such that the coding field composed of 2 bits or greater may be defined to support the independent coding schemes.

A short guard interval (SGI) field indicates whether a short GI is applied to PSDU transmission of the SU frame or the MU frame. In case of the MU frame, if SGI is applied to the MU frame, this means that the SGI can be commonly applied to all users contained in the MU-MIMO group.

The GID field represents Multi-User (MU) group information of the MU frame. In case of the SU frame, a user group need not be defined, so that the GID field is not contained in the SIG-A field.

A field of the number (Nsts) of space-time streams indicates the number of space streams of the SU frame or the MU frame. In case of the MU frame, the Nsts field represents the number of space streams of each STA contained in the corresponding MU group, such that 8 bits are required for the Nsts field. In more detail, a maximum of 4 users may be contained in one MU group and a maximum of space streams may be transmitted to each user, such that 8 bits are needed to correctly support the above-mentioned structure.

The partial AID (PAID) field may represent an ID of an STA configured to identify a reception STA for use in the SU frame. The PAID value in an uplink (UL) frame is composed of some parts of Basic Service Set ID (BSSID). In a downlink (DL) frame, the PAID value may be composed of the AID-hashed result of the STA. For example, BSSID may be 48 bits long, AID may be 16 bits long, and PAID may be 9 bits long.

In addition, according to a new definition and usage of PAID to be described later, PAID of the UL frame may be set to the hashed resultant value of some parts of a BSSID, and PAID of the DL frame may be set to the hashed resultant value of some parts of a BSSID.

The ACK indication field of Table 3 indicates the type of an ACK signal to be transmitted after the SU frame or the MU frame. For example, if the ACK indication field is set to 00, this means a normal ACK. If the ACK indication field is set to 01, this means a block ACK. If the ACK indication field is set to 10, this means No ACK. However, the ACK indication field is not limited to three ACK types, and may also be classified into three or more ACK types according to response frame attributes.

In addition, although not shown in Table 3, the SIG field may include a DL/UL indication field (e.g., 1-bit size) explicitly indicating whether the corresponding frame is a DL frame or a DL frame. The DL/UL indication field is defined in the SU frame. The DL/UL indication field is not defined in the MU frame, and is always used as a DL frame in the MU frame. Alternatively, the SIG field may further include the DL/UL indication field irrespective of types of the SU and MU frames.

Meanwhile, the SIG-B field in the MU frame shown in FIG. 14 may further include user-specific information. The following Table 4 exemplarily shows fields used as constituent elements of the SIG-B field of the MU frame. In addition, Table 1 exemplarily shows various parameters applied to PPDUs of respective bandwidths (BWs) 2, 4, 8 and 16 MHz.

TABLE 4

|  | BW | | | |
| --- | --- | --- | --- | --- |
|  | 2 MHz | 4 MHz | 8 MHz | 16 MHz |
| MCS | 4 | 4 | 4 | 4 |
| Tail | 6 | 6 | 6 | 6 |
| CRC | 8 | 8 | 8 | 8 |
| Reserved | 8 | 9 | 11 | 11 |
| Total | 26 | 27 | 29 | 29 |

In Table 4, an MCS field may indicate an MCS field of a PPDU transmitted in the form of an MU frame per user.

A TAIL bit may enable an encoder to return to a zero (0) state.

The CRC (Cyclic Redundancy Check) field may be used to detect an error from an STA configured to receive the MU frame.

Another Embodiment of SIG Field Bit Allocation

The SIG field applied to the SU/MU frame according to another embodiment of the present invention will be given below.

Table 5 shows another embodiment of the SIG-A field.

TABLE 5

|  | SU | MU |
| --- | --- | --- |
| Duration | 9 | 9 |
| BW | 2 | 2 |
| Aggregation | 1 |  |
| STBC | 1 | 1 |
| Coding | 2 | 5 |
| SGI | 1 | 1 |
| GID | 6 | 6 |
| Nsts | 2 | 8 |
| PAID | 9 |  |
| ACK Indication | 2 | 2 |
| Reserved | 3 | 4 |
| CRC | 4 | 4 |
| Tail | 6 | 6 |
| Total | 48 | 48 |

Compared to the SIG-A field of Table 3, the SU/MU indication bit is not shown in Table 5. Instead of the SU/MU indication bit, the GID field may be used to discriminate between the SU frame and the MU frame as shown in Table 5.

The GID field is contained in the SU frame and the MU frame. If the GID value is set to 0, this means that the corresponding frame is an SU frame transmitted on uplink (e.g., a link from STA to AP). If the GID value is set to 63, this means that the corresponding frame is an SU frame transmitted on downlink (i.e., from AP to STA). If the GID value is selected from among 1~62, this means that the corresponding frame is the MU frame.

In the example of the SIG-A bit allocation shown in Table 5, the Length/Duration field of Table 3 is limited to the Duration field shown in Table 5. In the example of Table 3, if the aggregation field is set to zero (0), the Length/Duration field has the Length value. However, the SIG-A field may be defined to always have the Duration value as shown in the example of Table 5. Meanwhile, for the case in which the aggregation field value is set to zero (0), the length value may be contained in the SIG-B field but not the SIG-A field.

In case of using the SU frame according to the related art, if the aggregation field of the SIG-A field is set to 0, the Length/Duration field is used as the length field, third party STAs need to decode the data part so as to recognize duration information of the corresponding frame (in more detail, duration information is contained in the MAC header of the data part). However, if the duration field is defined to be contained in the SIG-A field of the frame as shown in the example of Table 5, third party STAs need not decode the data part of the frame so as to calculate a PPDU transmission time of the frame. Since the data part of the frame need not be decoded, it is not necessary to recognize the MCS of the corresponding frame. Therefore, the MCS value may not be contained in the SIG-A corresponding to the omni portion, and may be contained in the SIG-B including user-specific information. Accordingly, the example of Table 5 may not include the MCS field as compared to the example of Table 3.

The SIG-B field of the MU frame includes user-specific information, and may be defined in the same manner as in Table 4.

Differently from the example of Table 4, the Length field and the MCS field are contained in the SIG-B field of the SU frame. The following Table 6 shows bit allocation of the SIG-B of the SU frame according to another example of the present invention.

TABLE 6

|  | BW | | | |
| --- | --- | --- | --- | --- |
|  | 2 MHz | 4 MHz | 8 MHz | 16 MHz |
| MCS | 4 | 4 | 4 | 4 |
| Length | 9 | 9 | 9 | 9 |
| Tail | 6 | 6 | 6 | 6 |
| CRC | 4 | 4 | 4 | 4 |
| Reserved | 3 | 4 | 6 | 6 |
| Total | 26 | 27 | 29 | 29 |

In Table 6, the MCS field represents the modulation and coding scheme for use in PSDU transmission.

The Length field of Table 6 represents the number of bytes of PSDU, and may be used in case of the aggregation level (i.e., a value of the aggregation field of SIG-A) of 0. However, the scope or spirit of the Length field is not limited thereto. Even if the aggregation field is set to 1, the Length field may be contained in the SIG-B field.

In Table 6, the CRC field of the SIG-B bit allocation may be defined to have 4 bits long in the same manner as in SIG-A (e.g., Table 5). While the CRC field is 8 bits long in the example of Table 4, it should be noted that the CRC field may be defined to have 4 bits long so as to guarantee reserved bits of the SIG-B as shown in the example of Table 6.

New Definition and Usage of PAID

PAID is a non-unique identifier of an STA. As shown in Table 3 or 5, PAID may be contained in the SU frame. In more detail, the PAID may be contained in the SU frame defined in a sub-1 GHz operation frequency. PAID may be limited to 9 bits long.

The embodiment of the present invention provides a method for discriminating between a DL frame and a UL frame using the PAID field. The above-mentioned embodiment can be efficiently applied to the case in which the DL/UL indication field is not contained in the SIG field. The embodiment of the present invention can define a method for discriminating between the DL frame and the UL frame using the PAID although the DL/UL indication field is contained in the SIG field, such that the above-mentioned embodiment can still be efficiently utilized. That is, the PAID definition and usage method according to the present invention may be utilized irrespective of the presence or absence of DL/UL indicators.

As described above, if a GID value is set to any one of 0~63, each UL SU frame (i.e., SU frame in which an intended receiver is an AP) and each DL SU frame (i.e., SU frame in which an intended receiver is an STA) may be defined. In the meantime, if a GID value is set to any one of 1~62, this means an MU frame. However, if the GID field is not present and the DL/UL indicator field is not present, this means that it is impossible to discriminate between DL and UL of the SU frame according to the related art.

In order to solve the above problems, the present invention provides a method for determining whether the corresponding frame is a DL frame or a UL frame using a value of the PAID field. Values of the PAID field may be defined in Table 7 according to examples of the present invention.

TABLE 7

| Condition | Partial AID |
| --- | --- |
| Addressed to AP | $(dec(BSSID[39:47]) \bmod (2^9 - 1)) + 1$ |
| Addressed to Mesh STA | $(dec(BSSID[39:47]) \bmod (2^9 - 1)) + 1$ |
| Sent by an AP and addressed to a STA associated with that AP or sent by a DLS or TDLS STA in a direct path to a DLS or TDLS STA | $(dec(AID[0:8]) + dec(BSSID[44:47] XORBSSID[40:43])] \times 2^5) \bmod 2^9$ where mod X indicates the X-modulo operation, dec(A[b:c]) is the cast to decimal operator where b is scaled by $2^0$ and c by $2^{(c-b)}$. |
| Otherwise | 0 |

In the example of Table 7, a method for calculating a PAID value of each frame type is defined.

Referring to Table 7, the PAID value in the case in which the STA transmits a UL frame to the AP may be calculated as follows.

(1) 9 bits from the $40^{th}$ bit to the $48^{th}$ bit are extracted from a BSSID of the AP. In this case, if the bit index starts from Bit 0, the position of the $40^{th}$ bit corresponds to Bit 39, and the position of the $48^{th}$ bit corresponds to Bit 47. Alternatively, if the bit index starts from Bit 1, the position of the $40^{th}$ bit corresponds to Bit 40, and the position of the $48^{th}$ bit corresponds to Bit 48. The following examples assume the bit index starting from Bit 0 for convenience of description and better understanding of the present invention, it should be noted that the principles of the present invention may also be applied to the case in which a bit index starts from Bit 1.

(2) 9 extracted bits are converted into a decimal number. Conversion to a decimal number may be denoted by dec(A), and dec(A) is a specific value obtained when A is converted into a decimal number.

(3) The operation 'mod (2^9-1)' is applied to the converted decimal number. Here, "mod" is a modulo operation, "X mod Y" is the remainder when X is divided by Y, and $2^9=2^9=512$, and $2^9-1=511$. Therefore, the resultant value of the Step (3) is set to one of 0 to 510.

(4) The value of 1 is added to the resultant value of the mod (2^9-1) operation, and the added result is set to one of 1 to 511, such that the resultant value is the final result value acting as a PAID.

The above-mentioned steps may be represented by the following equation 2:

$$\text{dec}(BSSID[39:47])\bmod(2^9-1)+1 \qquad \text{[Equation 2]}$$

The reason why the PAID value is calculated as shown in the Equation 2 is to prevent the PAID value from being zero. PAID=0 is used for other usages such as multicast/broadcast.

In the example of Table 7, a PAID in frame transmission between mesh STAs is calculated as follows. 9 bits from the $40^{th}$ bit to the $48^{th}$ bit of a BSSID of the counterpart mesh STA acting as a peer are converted into a decimal number, the value of 1 is added to the resultant value of the mod (2^9-1) operation, and the added result is set to one of 1 to 511, such that the resultant value is the final result value acting as a PAID. That is, while Equation 2 is equally applied to frame transmission to the mesh STA, a BSSID of the AP may be replaced with a BSSID of the mesh STA according to the PAID calculation scheme of the UL frame.

In a first case in which the AP transmits a DL frame to the STA and in a second case in which the STA transmits a frame through a Direct Link Setup (DLS)/Tunneled Direct Link Setup (TDLS) link on a direct path, the PAID is calculated as shown in the following equation 3:

$$(\text{dec}(AID[0:8])+\text{dec}(BSSID[44:47] \text{ XOR } BSSID[40:43])\times 2^5)\bmod 2^9 \qquad \text{[Equation 3]}$$

In Equation 3, XOR is an exclusive OR operation. For example, 1 XOR 1=0, 0 XOR 1=1, 1 XOR 0=1, and 0 XOR 0=0 may be calculated by Equation 3.

In case of the DL frame or the DLS/TDLS frame, partial information of BSSID and AID is hashed as shown in Equation 3, such that the hashed resultant value is used as a PAID. In more detail, 9 bits from the first bit position to the ninth bit position of the AID are converted into a decimal number (i.e., dec(AID[0:8])). In addition, the resultant value (i.e., BSSID[44:47] XOR BSSID[40:43]) obtained when 4 bits (i.e., BSSID[44:47]) from the $45^{th}$ bits to the $48^{th}$ bit of a BSSID are XOR-operated with 4 bits (i.e., BSSID[40:43]) from the $41^{st}$ bit to the $44^{th}$ bit of a BSSID is converted into a decimal number (i.e., dec(BSSID[44:47] XOR BSSID[40:43])). In the above-mentioned calculation result, the XOR result based on BSSID is 4 bits long, and is converted into a decimal number. 9 bits in AID are converted into a decimal number, $2^5$ is multiplied by the decimal resultant value obtained from a BSSID so as to adjust a digit number (where multiplication of $2^5$ is conceptually identical to the case in which the length of 5 bits is added to a binary number). Therefore, the result obtained on the basis of a BSSID is added to the result obtained from the AID. The mod $2^9$ operation is performed on the added result, so that one of 0~511 may be set to a PAID.

The term "Otherwise" shown in Table 7 means that a broadcast/multicast frame transmitted to all STAs by an AP or a frame transmitted by a non-associated STA is used. In this case, a PAID value is set to zero (0).

If the PAID value is calculated according to a predetermined condition as shown in Table 7, an AP considers only a specific frame in which the PAID value is identical to 0 or 'dec(BSSID[39:47])mod(2^9-1))+1' to be a frame having a high possibility that the frame is transmitted to the AP, and then decodes a PSDU.

In addition, an STA considers only a specific frame in which the PAID value is identical to 0 or dec(AID[0:8]+dec (BSSID[44:47] XOR BSSID[40:43])×$2^5$)mod $2^9$ to be a frame having a high possibility that the frame is transmitted to the STA, and then decodes a PSDU.

In this case, when the AP allocates the AID to the STA, it is preferable that a specific AID through which the resultant value of Equation 3 calculated by an allocated AID is set to zero (0) may not be allocated to the STA. If the AID through which the calculation result of Equation 3 is set to zero (0) is allocated to the STA, a PAID value of the frame transmitted to the corresponding STA is set to 0, such that all other STAs consider the corresponding frame to be a multicast/broadcast frame irrespective of a receiver of the corresponding frame, and thus attempt to perform unnecessary PSDU decoding of the corresponding frame. Therefore, an AID through which the resultant value of Equation 3 is set to 0 so as to distinguish a current frame from a different type of frame need not be allocated to the STA.

In addition, when the AP allocates an AID to the STA, it is preferable that a specific AID by which a first calculation result (i.e., dec(BSSID[39:47])mod(2^9-1))+1) of the Equation 2 based on a BSSID of the AP is identical to a second calculation result (i.e., dec(AID[0:8]+dec(BSSID[44:47] XOR BSSID[40:43])×$2^5$)mod $2^9$) of the Equation 3 based on an AID allocated to the STA and a BSSID of the AP may not be allocated to the STA. In case of allocating an AID of a specific STA in a manner that a PAID value (i.e., the calculation result of Equation 2) for the UL frame is identical to a PAID value (i.e., the calculation result of Equation 3) of the DL frame, the specific STA considers UL frames transmitted from other STAs to the AP to be DL frames for the specific STA, such that the STA attempts to perform unnecessary PSDU decoding of the corresponding frames.

In addition, when an overlapping BSS is present, an AP (i.e., AP associated with STA) may allocate an AID of the STA in consideration of an OBSS BSSID of the AP of an OBSS (i.e., a BSS operated at the same channel as that of a BSS of the AP associated with the STA, and may overlap some or all of a BSA) constructing an OBSS. That is, when the AP allocates the AID to the STA, a specific AID, through which the calculation result (i.e., (dec(AID[0:8]+dec(BSSID [44:47] XOR BSSID[40:43])×$2^5$)mod $2^9$) of Equation 3 on the basis of both an AID allocated to the STA and a BSSID of the AP is identical to the calculation result (i.e., dec(OBSS BSSID[39:47])mod (2^9-1))+1) of Equation 2 on the basis of a BSSID of an OBSS, is not allocated to the STA. (Preferably, an AP should not assign an AID to a STA that results in the PARTIAL_AID value, as computed using Equation 3, being equal to either (dec(BSSID[39:47])mod(29-1))+1 or (dec(Overlapping BSSID[39:47])mod(29-1))+1.) Otherwise, an STA considers all OBSS UL frames transmitted from STAs contained in an OBSS to an OBSS AP to be DL frames to be transmitted for the STA, such that it attempts to perform unnecessary PSDU decoding of the corresponding frames.

In other words, when the AP allocates an AID to the STA, a PAID value to be obtained when Equation 3 (i.e., dec(AID [0:8]+dec(BSSID[44:47] XOR BSSID[40:43])×$2^5$)mod $2^9$) is applied to an AID to be allocated should not be identical to each of (dec(BSSID[$^3$9:47])mod(2^9-1))+1 and (dec (OBSS BSSID[39:47])mod(2^9-1))+1. That is, not only a first AID through which a PAID value obtained when (dec(AID[0:8]+dec(BSSID[44:47] XOR B$^S$SID[40:43])×

$2^5$)mod $2^9$ is applied to an AID value to be allocated is identical to (dec(BSSID[39:47])mod($2^9$−1))+1, but also a second AID through which the obtained PAID value is identical to (dec(OBSS BSSID[39:47])mod($2^9$−1))+1 is excluded from the AID to be allocated, such that an AID selected from among the remaining AIDs must be allocated to the STA.

In order to prevent the OBSS collision problem from occurring, the AP has to recognize a BSSID (i.e., OBSS BSSID) of the OBSS AP. However, if the AP does not detect the OBSS AP, a specific AID through which the calculation result of Equation 3 on the basis of the AID allocated to the AP-associated STA is identical to the calculation result of Equation 3 on the basis of the OBSS BSSID may also be allocated to the STA. In this case, the STA may request the AP to change a current AID to another AID.

For example, assuming that a specific AID through which the calculation value of (dec(AID[0:8])+dec(BSSID[44:47] XOR BSSID[40:43])×$2^5$)mod $2^9$ is identical to dec(OBSS BSSID[39:47])mod ($2^9$−1))+1 is allocated to the STA, the STA may transmit an AID reassignment request frame to the AP. If the AP receives the AID reassignment request frame and a reason code of the AID reassignment request frame indicates "Partial AID Collision", the AP does not allocate the corresponding AID value to STAs. The AP transmits the AID reassignment response frame to the corresponding user equipment (UE), such that it may allocate a new AID to the UE. A detailed example of the present invention will be given in the following "AID reassignment request/response" item.

In order to enable a PAID to be used for appropriate purposes in consideration of the above-mentioned cases, when the AP allocates an AID to UEs, a DL-frame PAID value (i.e., the calculation result of Equation 3) obtained through the hashed result of AID and BSSID should not overlap a PAID value (e.g., zero 0) designated for a specific frame type such as a multicast/broadcast type, and should not overlap a PAID value (i.e., the calculation result of Equation 2) of the UL frame transmitted to either an AP (i.e., associated AP) or an OBSS AP. In addition, in order to prevent collision from being generated, an AID corresponding to the above three conditions is not allocated as an AID of each STA, and may be used for separate usages (e.g., multicast frame).

In addition, a PAID value of the AP may be selected as an arbitrary one from among values of a specific range. In case of a PAID value of the AP, a DL-frame PAID value obtained through the hashed result of AID and BSSID should not be identical to a PAID value designated for a specific STA as in the UL frame transmitted to an AP or an OBSS AP.

In accordance with additional embodiments of the example of Table 7, a PAID value to be used for a specific-type frame (for example, a beacon frame, a probe response frame, etc.) may be pre-designated, and a PAID for a normal frame may not be set to a predetermined value for the specific-type frame. Associated examples are shown in Table 8.

TABLE 8

| Condition | Partial AID |
|---|---|
| Addressed to AP | (dec(BSSID[39:47])mod ($2^9$ − 1 − k)) + 1 + k |
| Addressed to Mesh STA | (dec(BSSID[39:47])mod ($2^9$ − 1 − k)) + 1 + k |
| Sent by an AP and addressed to a STA associated with that | (dec(AID[0:8]) + dec(BSSID[44:47]XORBSSID[40:43]) × $2^5$)mod $2^9$ |

TABLE 8-continued

| Condition | Partial AID |
|---|---|
| AP or sent by a DLS or TDLS STA in a direct path to a DLS or TDLS STA | where mod X indicates the X-modulo operation, dec(A[b:c]) is the cast to decimal operator where b is scaled by $2^0$ and c by $2^{(c-b)}$. |
| Special frame (e.g., Beacon frame or Probe Response frame) | 1 . . . k |
| Otherwise | 0 |

If PAID #1 is allocated to a beacon frame and PAID #2 is allocated to a probe response frame as shown in the example of Table 8, the AP must allocate PAIDs (0, 1, 2) to a DL frame and must allocate an AID not used in a UL frame to each of STAs.

For this purpose, as shown in the example of Table 8, in order to prevent a PAID of the UL frame (i.e., a frame directed to the AP) from being set to the value of 0, 1, or 2, PAID can be calculated as shown in the following Equation 4.

$$\text{dec}(BSSID[39:47])\text{mod}(2^9-1-2)+1+2 \qquad \text{[Equation 4]}$$

Equation 4 may represent the case in which k=2 is given in the example of Table 8. That is, 9 bits from the $40^{th}$ bit to the $48^{th}$ bit of an AP BSSID are denoted by a decimal number (i.e., dec([39:47])), and the mod($2^9$−1−2) operation is applied to the resultant decimal number, so that the values of 0 to 508 are obtained, 3 is added to the values 0 to 508 to result in 3 to 511. As a result, one of 3 to 511 may be used as a PAID value of the UL frame.

In accordance with an additional proposal of the present invention, a specific part that uses 9 bits from the $40^{th}$ bit position to the $48^{th}$ bit position (i.e., [39:47]) of an AP BSSID may also be replaced with a different value obtained when 8 bits from the $41^{st}$ bit position to the $48^{th}$ bit position (i.e., [40:47]) of an AP BSSID is concatenated with a binary value of 1. In this case, the bit position at which concatenation of the binary value 1 occurs may represent a Least Significant Bit (LSB) or Most Significant Bit (MSB) corresponding to 8 bits.

AID Reassignment Request/Response

FIG. 15(a) exemplarily shows an example of an AID reassignment request frame format, and FIG. 15(b) exemplarily shows an example of an AID reassignment response frame format.

Referring to FIG. 15(a), the Category field may be set to a specific value indicating a category associated with the corresponding frame. The Action field may be set to a specific value indicating which one of management operations contained in the above category field is associated with the corresponding frame.

The reason code may be set to a specific value indicating Partial AID (PAID) Collision. When an STA transmits the AID reassignment request frame to the AP, the STA further transmits Partial BSSID information regarding a BSSID of all OBSS APs detected by the STA, such that collision between the STA and each of the OBSS BSSIDs is prevented from occurring when the AP reassigns an AID for the corresponding STA.

'OBSS Partial BSSID List' field may include 8 bits [40:47] from among OBSS BSSID.

In response to the AID reassignment request frame, the AP may transmit an AID reassignment response frame having a frame format shown in FIG. 15(b) to the STA.

Referring to FIG. 15(b), the Category field may be set to a specific value indicating a category associated with the corresponding frame. The Action field may be set to a specific value indicating which one of management operations contained in the above category field is associated with the corresponding frame.

The New AID field may include an AID that is newly allocated from the AP to the STA. When the AP allocates a new AID, a new AID must be allocated in such a manner that OBSS BSSIDs known through the OBSS Partial BSSID list of the AID reassignment request frame do not collide with a PAID value calculated on the basis of a newly allocated AID.

The AID Activation Offset field indicates a time offset consumed until reaching a specific time at which a newly allocated AID value is actually used. Such a time offset unit may be represented in units of a beacon interval, a DTIM beacon interval, or a time unit. TU may be configured in units of microsecond (μs), for example, 1024 μs.

The Duty Cycle field represents a duty cycle of an AID and a group having the AID, and may include a sleep interval or an inactivation duration.

Additional Proposal of SIG-B Field of the SU Field

In case of the SU frame, all information for decoding the corresponding frame may be contained in the SIG-A field, such that the SIG-B field may be no longer required. Accordingly, the SU frame format may be configured according to a specific communication scheme in which the SIG-B field is not transmitted in the SU-frame.

However, definition of a separate format other than the SIG-B field may unavoidably increase the processing load of a frame generation part and a frame reception/decoding part, such that the SU frame is configured to include the SIG-B field as in the legacy art, and the constituent content of the SU frame may be configured as follows. The SIG-B field need not include substantial control information, such that the sequence of a fixed pattern for reducing a Peak to Average Power Ratio (PAPR) is defined and repeated, resulting in construction of the SIG-B field.

FIG. 16 exemplarily shows fixed sequences available as an SIG-B field.

FIG. 16(a) exemplarily shows examples of the fixed sequence available as the SIG-B field of 2 MHz PPDU. FIG. 16(b) exemplarily shows examples of the fixed sequences available as the SIG-B field of 4 MHZ PPDU. FIG. 16(c) exemplarily shows examples of the fixed sequences available as the SIG-B field of 8 MHz/16 MH/8+8 MHz PPDU.

Referring to FIG. 16(a), in the case of using a PPDU of a 2 MHz bandwidth, a total bit length of the SIG-B field is denoted by 26 as shown in Table 4, and 6 bits from among 26 bits are allocated to TAIL bits. Therefore, the length of a fixed sequence may be 20 bits long (i.e., B0 to B19). The sequence pattern of FIG. 16(a) is only exemplary, and the scope or spirit of the present invention is not limited thereto.

Referring to FIG. 16(b), in the case of using a PPDU of a 4 MHz bandwidth, a total bit length of the SIG-B field is denoted by 27 as shown in Table 4, and 6 bits from among 27 bits are allocated to TAIL bits. Therefore, the length of a fixed sequence may be 21 bits long (i.e., B0 to B20). The sequence pattern of FIG. 16(b) is only exemplary, and the scope or spirit of the present invention is not limited thereto.

Referring to FIG. 16(c), in the case of using a PPDU of a 8 MHz/16 MH/8+8 MHz bandwidth, a total bit length of the SIG-B field is denoted by 29 as shown in Table 4, and 6 bits from among 29 bits are allocated to TAIL bits. Therefore, the length of a fixed sequence may be 23 bits long (i.e., B0 to B22). The sequence pattern of FIG. 16(c) is only exemplary, and the scope or spirit of the present invention is not limited thereto.

FIG. 17 is a conceptual diagram illustrating a method repeated in the SIG-B field when a fixed pattern of FIG. 16 is transmitted to PPDU.

In the example of 2 MHz PPDU of FIG. 17, 20 bits may correspond to a fixed sequence pattern of FIG. 16(a).

In the 4 MHz PPDU example of FIG. 17, 21 bits may correspond to a fixed sequence pattern of FIG. 16(b). Here, 4 MHz PPDU exemplarily shows that the SIG-B field (i.e., fixed sequence+TAIL) is repeated once more (i.e., a total of twice transmission).

In the 8 MHz PPDU example of FIG. 17, 23 bits may correspond to the fixed sequence pattern of FIG. 16(c). Here, 8 MHz PPDU exemplarily shows that the SIG-B field (i.e., fixed sequence+TAIL) is repeated three times more (i.e., the SIG-N field is transmitted four times). A padding bit of 1 bit may be added to the SIG-B field in a manner that a total length obtained by repetition of the SIG-B field is adjusted to a predetermined length.

In the 16 MHz PPDU example of FIG. 17, 23 bits may correspond to the fixed sequence pattern of FIG. 16(c). Here, 16 MHz PPDU exemplarily shows that the SIG-B field (i.e., fixed sequence+TAIL) is repeated three times more (i.e., the SIG-B field is transmitted four times) and the set to which the padding is added is repeated once more (i.e., twice transmission).

Figure 18:
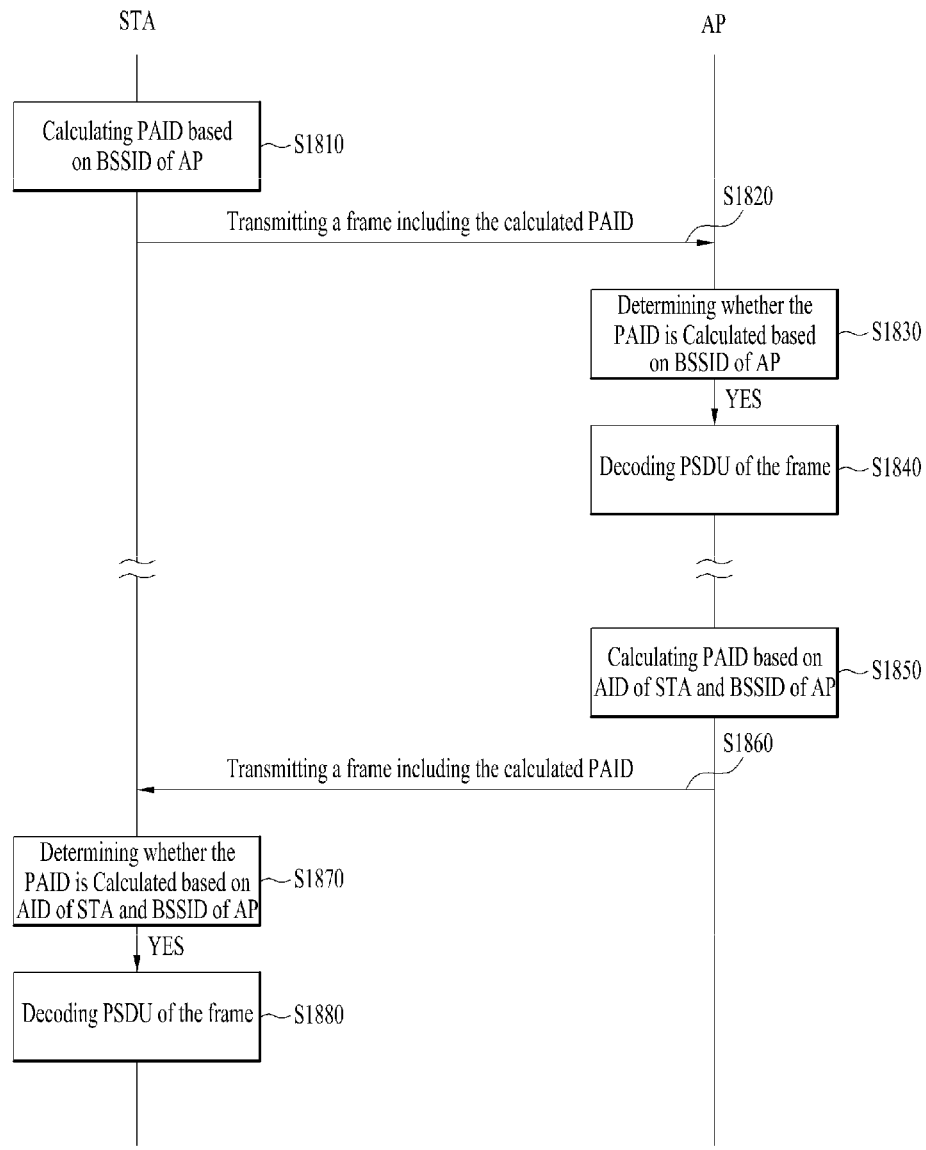
FIG. 18 is a flowchart illustrating a method for transmitting and receiving a frame according to one embodiment of the present invention.

FIG. 18 is a flowchart illustrating a method for transmitting and receiving a frame according to one embodiment of the present invention.

Referring to FIG. 18, an STA may calculate a PAID contained in a frame (i.e., UL frame) addressed to an AP on the basis of a BSSID of an AP as shown in the example of the present invention in step S1810. For example, the resultant value of Equation 2 (i.e., (dec(BSSID[39:47])mod $(2^9-1))+1$) may be contained in a PAID field. Accordingly, a PAID of the UL SU frame may be set to a value but not '0' (e.g., any one of 1 to 511). In this case, the UL SU frame may be defined as a frame transmitted at sub-1 GHz operation frequency band.

In step S1820, the STA constructs a PAID field including a PAID value calculated at step S1810 and an SIG-A field including various fields proposed by Table 3, and may transmit a frame constructed according to the SU frame format (e.g., SU PPDU frame format) including other fields to the AP.

In step S1830, the AP may receive the frame, and may confirm a PAID field of the SIG-A field of the frame. That is, the AP may determine whether the PAID value is calculated on the basis of a BSSID of the AP.

In step S1840, if it is determined that the PAID field value of the frame of step S1830 is calculated (e.g., calculated according to Equation 2) on the basis of a BSSID of the AP, the AP may perform PSDU decoding of the PPDU frame.

In the meantime, the AP may calculate a PAID value to be contained in a frame to be transmitted to the STA in step S1850. The PAID value contained in the frame to be transmitted by the AP may be calculated on the basis of both an AID allocated to the STA and a BSSID of the AP (e.g., dec(AID[0:8]+dec(BSSID[44:47] XOR BSSID[40:43])×$2^5$) mod $2^9$).

In this case, the AID value allocated to the STA must be allocated in a manner that the PAID value calculated using the corresponding AID value is not identical to each of a first PAID and a second PAID.

The first PAID may be a specific value (i.e., (dec(BSSID [39:47])mod$(2^9-1))+1$) calculated by applying the modulo operation to the resultant value obtained when values from the $40^{th}$ bit position and the $48^{th}$ bit position from among 48 bit positions of a BSSID of the AP are converted into a decimal number. The second PAID may be a specific value (i.e., (dec(OBSS BSSID[39:47])mod($2^9-1$))+1) calculated by applying the modulo operation to the resultant value obtained when values from the 40$^{th}$ bit position to the 48$^{th}$ bit position from among 48 bit positions of a BSSID of the OBSS are converted into a decimal number.

In step S1860, the AP constructs a PAID field including a PAID value calculated at step S1850 and an SIG-A field including various fields proposed by Table 3, and may transmit a frame constructed according to the SU frame format (e.g., SU PPDU frame format) including other fields to the STA.

In step S1870, the STA may receive the frame, and may confirm a PAID field of the SIG-A field of the frame. That is, the STA may determine whether a PAID value is calculated on the basis of an AID allocated to the STA by the AP and a BSSID of the AP.

In step S1880, if it is determined that the PAID field value of the frame of step S1870 is calculated (e.g., calculated according to Equation 3) on the basis of an AID of the STA and a BSSID of the AP, the STA may perform PSDU decoding of the PPDU frame.

In a method (specifically, the PAID construction method) for transmitting and receiving a frame according to the present invention as shown in FIG. 18, various embodiments of the present invention are performed independently or two or more embodiments of the present invention are performed simultaneously.

Figure 19:
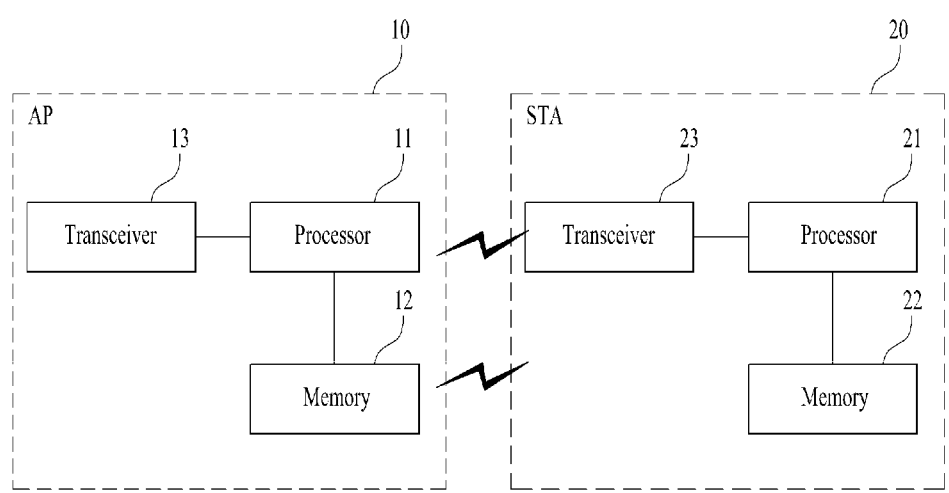
FIG. 19 is a block diagram illustrating a radio frequency (RF) device according to one embodiment of the present invention.

FIG. 19 is a block diagram illustrating a radio frequency (RF) device according to one embodiment of the present invention.

Referring to FIG. 19, an AP 10 may include a processor 11, a memory 12, and a transceiver 13. An STA 20 may include a processor 21, a memory 22, and a transceiver 23. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 may be configured to operate according to the above-described various embodiments of the present invention. Modules for implementing operation of the AP and STA according to the above-described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

The overall configuration of the AP and STA may be implemented such that above-described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments may be applied in the same manner to various mobile communication systems.

The invention claimed is:

1. A method for transmitting a frame from a station (STA) to an access point (AP) of a wireless communication system, the method comprising:
    setting, by the STA, a partial association ID (AID) field of the frame to a partial AID value; and
    transmitting, by the STA, the frame including the partial AID field set to the partial AID value,
    wherein when the frame is addressed to the AP, the partial AID value corresponds to (BSSID[39:47])mod($2^9$−1))+1, where 'A[b:c]' denotes bits from Bit b to Bit c of a binary number A when an initial bit of the binary number A is denoted by Bit 0, and 'mod' denotes a modulo operation.

2. The method according to claim 1, wherein the partial AID (PAID) is set to one of 1 to 511.

3. The method according to claim 1, wherein the partial AID (PAID) field is included in a Signal A (SIG-A) field of the frame.

4. The method according to claim 1, wherein the frame is a single user (SU) frame.

5. The method according to claim 1, wherein the frame is defined at a sub-1 GHz operation frequency.

6. The method according to claim 1, wherein the frame further includes a field indicating whether the frame has a single user (SU) frame format or a multi-user (MU) frame format.

7. The method according to claim 1, wherein the frame excludes a group ID (GID) field.

8. A method for receiving a frame from a station (STA) at an access point (AP) of a wireless communication system, the method comprising:
    receiving, from the STA by the AP, the frame including a partial association ID (AID) field;
    checking, by the AP, whether a value of the partial AID field of the frame reflects a basic service set ID (BSSID) of the AP; and
    decoding, by the AP, the frame, if the value of the partial AID field of the frame reflects the BSSID,
    wherein when the frame is addressed to the AP, the partial AID corresponds to (BSSID[39:47])mod($2^9$−1))+1, where 'A[b:c]' denotes bits from Bit b to Bit c of a binary number A when an initial bit of the binary number A is denoted by Bit 0, and 'mod' denotes a modulo operation.

9. The method according to claim 8, wherein the partial AID (PAID) is set to one of 1 to 511.

10. The method according to claim 8, wherein the partial AID (PAID) field is included in a Signal A (SIG-A) field of the frame.

11. The method according to claim 8, wherein the frame is a single user (SU) frame.

12. The method according to claim 8, wherein the frame is defined at a sub-1 GHz operation frequency.

13. A station (STA) device for transmitting a frame to an access point (AP) of a wireless communication system comprising:
a processor that sets a partial association ID (AID) field of the frame to a partial AID value; and
a transceiver that transmits, to the AP, the frame including the partial AID field set to the partial AID value,
wherein when the frame is addressed to the AP, the partial AID value corresponds to (BSSID[39:47])mod($2^9$−1))+1, where 'A[b:c]' denotes bits from Bit b to Bit c of a binary number A when an initial bit of the binary number A is denoted by Bit 0, and 'mod' denotes a modulo operation.

14. An access point (AP) device for receiving a frame from a station (STA) of a wireless communication system comprising:
a transceiver that receives, from the STA, the frame including a partial association ID (Partial AID) field; and
a processor that checks whether a value of the partial AID field of the frame reflects a basic service set ID (BSSID) of the AP and decodes the frame if the value of the partial AID field reflects the BSSID,
wherein when the frame is addressed to the AP, the partial AID corresponds to (BSSID[39:47])mod($2^9$−1))+1, where 'A[b:c]' denotes bits from Bit b to Bit c of a binary number A when an initial bit of the binary number A is denoted by Bit 0, and 'mod' denotes a modulo operation.

15. The method according to claim 6, wherein the partial AID field is included in the frame only when the field indicates the SU frame format.

\* \* \* \* \*